United States Patent
Payne et al.

(10) Patent No.: US 9,463,646 B2
(45) Date of Patent: Oct. 11, 2016

(54) TILTING TOUCH SCREEN FOR PRINTER AND PRINTER WITH TILTING TOUCH SCREEN

(71) Applicant: TransAct Technologies Incorporated, Hamden, CT (US)

(72) Inventors: Stephen Payne, Cortland, NY (US); Steven Supron, Ithaca, NY (US); Bruce Harris, Freeville, NY (US)

(73) Assignee: TransAct Technologies Incorporated, Hamden, CT (US)

( * ) Notice: Subject to any disclaimer, the term of this patent is extended or adjusted under 35 U.S.C. 154(b) by 188 days.

(21) Appl. No.: 13/644,114

(22) Filed: Oct. 3, 2012

(65) Prior Publication Data

US 2013/0088451 A1    Apr. 11, 2013

Related U.S. Application Data

(60) Provisional application No. 61/544,347, filed on Oct. 7, 2011.

(51) Int. Cl.
| | |
|---|---|
| *B41J 3/46* | (2006.01) |
| *B41J 29/13* | (2006.01) |
| *B41J 3/407* | (2006.01) |
| *B41J 15/04* | (2006.01) |
| *G06F 3/041* | (2006.01) |

(52) U.S. Cl.
CPC .............. *B41J 3/46* (2013.01); *B41J 3/4075* (2013.01); *B41J 15/042* (2013.01); *B41J 29/13* (2013.01); *G06F 3/041* (2013.01)

(58) Field of Classification Search
CPC .......... B41J 3/46; B41J 29/13; B41J 15/042; B41J 3/4075
USPC ........................................................ 345/173
See application file for complete search history.

(56) References Cited

U.S. PATENT DOCUMENTS

| | | | | |
|---|---|---|---|---|
| 6,003,008 | A * | 12/1999 | Postrel et al. ................. 705/4 |
| 6,089,685 | A * | 7/2000 | Ryan et al. ................. 312/351 |
| 7,290,949 | B1 * | 11/2007 | Phillips et al. ............... 400/56 |
| 2003/0146954 | A1 * | 8/2003 | Tamura ........................ 347/50 |
| 2006/0132560 | A1 * | 6/2006 | Silverbrook ................. 347/86 |
| 2008/0182639 | A1 * | 7/2008 | Antonopoulos et al. ..... 463/17 |
| 2008/0185776 | A1 * | 8/2008 | Okuno et al. ............... 271/275 |
| 2010/0190552 | A1 * | 7/2010 | Rasmussen ......... G07F 17/3211 463/34 |
| 2011/0026043 | A1 * | 2/2011 | Goto et al. .................. 358/1.2 |

OTHER PUBLICATIONS

Pioneerpos, "The S-Line with integrated EPSON printer", undated, 2 pages.

(Continued)

*Primary Examiner* — Michael Faragalla
*Assistant Examiner* — Chayce Bibbee
(74) *Attorney, Agent, or Firm* — Lipsitz & McAllister, LLC

(57) ABSTRACT

A tilting touch screen for a printer and a printer having such a tilting touch screen are provided. The tilting touch screen may include a touch screen housing, a touch screen located in the touch screen housing, means for pivotally connecting the touch screen housing to a printer housing, the printer housing defining an opening closable by the tilting touch screen, and a controller for controlling the printer in communication with the touch screen. The screen tilts open for direct access to the print mechanisms and paper buckets for service or paper loading, without requiring the removal of any additional covers.

25 Claims, 18 Drawing Sheets

(56) References Cited

OTHER PUBLICATIONS

Avery Dennison, "9415 FreshMarx Programmable Labeling System", Nov. 18, 2008, 9 pages.

Avery Dennison, System Administrator's Guide, FRESHMARX 9415 Labeling System, 2007, 48 pages.

Ecolab USA INC, web pages printout "Prepnprint, The Next Generation of Food Rotation", retrieved on Sep. 23, 2011, URL<http://prepnprint.com>, 2 pages.

* cited by examiner

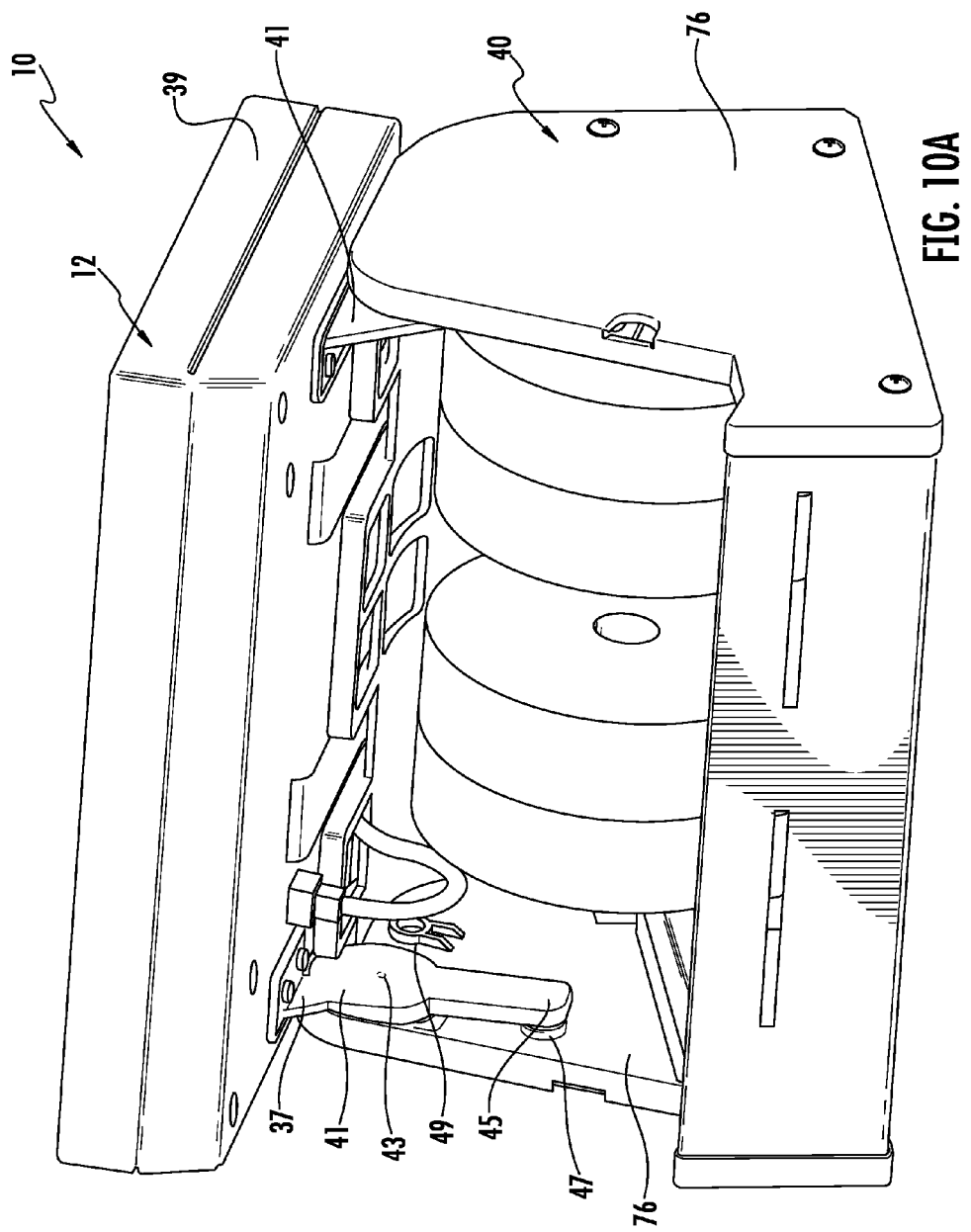

TILTING TOUCH SCREEN FOR PRINTER AND PRINTER WITH TILTING TOUCH SCREEN

This application claims the benefit of commonly-owned U.S. provisional application No. 61/544,347 filed on Oct. 7, 2011, which is incorporated herein and made a part hereof by reference

BACKGROUND OF THE INVENTION

The present invention relates generally to the field of label printers, such as those used for food preparation and inventory freshness. More particularly, the present invention relates to a tilting touch screen for a label printer and an improved label printer with such a tilting touch screen.

Restaurants are required to keep track of stored and/or refrigerated food products and ingredients. Label printers are provided in the food preparation/storage area of a restaurant and are used to create "freshness labels" for each package of food or ingredients which specify, among other things, the product/ingredient name, the arrival date and expiration date (and optionally time) for each package. A menu database is created for each class of food items used by a restaurant (sandwiches, salads, drinks, etc.), and the ingredients for each item are provided in the database. The menu database is downloaded to the printer terminal along with parameters for label size, format, expiration dates (or freshness periods), and the like. The label printer may include two print mechanisms, one for printing freshness labels and the other for printing nutritional information, ingredient labels, coupons, receipts, or the like.

Typical prior art label printers used to print freshness labels such as the Avery Dennison Monarch 9415 are expensive, have a large footprint, and provide unfavorable screen angles and features.

It would be advantageous to provide an improved label printer that is cheaper, smaller, easier to use, and easier to maintain than prior art label printers.

The methods and apparatus of the present invention provide the foregoing and other advantages.

SUMMARY OF THE INVENTION

The present invention relates to a tilting touch screen for a printer and a printer having such a tilting touch screen.

In one example embodiment of a tilting touch screen for a printer in accordance with the present invention, the tilting touch screen comprises a touch screen housing, a touch screen located in the touch screen housing, means for pivotally connecting the touch screen housing to a printer housing, the printer housing defining an opening closable by the tilting touch screen, and a controller for controlling the printer in communication with the touch screen.

The means for pivotally connecting the touch screen housing to the printer housing may comprise pivot arms pivotally coupling the touch screen housing to oppositely disposed inside surfaces of the printer housing at a corresponding pivot points. The pivot arms may each have a free end which extends beyond the corresponding pivot point. The free ends of the pivot arms may be resilient. Each of the free ends of the pivot arms may bear a corresponding protrusion. Each of the free ends of the pivot arms with the corresponding protrusion may be adapted to springingly engage into corresponding recesses in the oppositely disposed inside surfaces of the printer housing upon tilting of the touch screen into at least one of a fully open and a fully closed position. The protrusion may be adapted to be released from engagement with the corresponding recess upon tilting of the touch screen from the at least one of the fully open and the fully closed position.

Upper and lower recesses may be provided on the oppositely disposed inside surfaces of the printer housing. The free ends of the arms with the corresponding protrusions may spring into the lower recesses when the touch screen is tilted into the fully open position. The free ends of the arms with the corresponding protrusions may spring into the upper recesses when the touch screen is tilted into the fully closed position. In addition, one or more intermediate recesses may be provided for positioning the tilting touch screen in one or more corresponding positions between the fully open and the fully closed position.

In an alternate example embodiment, the means for pivotally connecting the touch screen housing to the printer housing may comprise counterbalanced friction hinges coupling the touch screen housing to oppositely disposed inside surfaces of the printer housing. The counterbalanced friction hinges may comprise a torsion spring and/or a friction clutch assembly.

In one example embodiment, the tilting touch screen may further comprise at least one print mechanism located in the tilting screen housing and in communication with the controller. Each of the at least one print mechanisms may comprise a print head, a stepper motor, and a top-of-form sensor. A platen associated with each of the at least one print mechanisms may be located in the printer housing. The tilting touch screen may further comprise a mechanical interface between the at least one print mechanism and the platen. The mechanical interface may further comprise at least one guiding surface for orienting the at least one print head with the platen.

A paper bucket associated with each of said at least one print mechanisms may be located in the printer housing and accessible upon tilting the touch screen into an open position. The paper bucket may be configured to receive one of a roll of paper or a fan-folded length of paper feedable to the at least one print mechanism.

In an alternate example embodiment, at least one print mechanism and at least one associated platen may be located in the printer housing. In such an example embodiment, the at least one print mechanism may be adapted to be connected to the tilting touch screen via detachable flexible flat cables. A driver card associated with the at least one print mechanism may be in communication with the controller via the detachable flexible flat cable. The controller may comprise a logic output adapted to be directed through the detachable flexible flat cable to the driver card to drive the printer. The at least one print mechanism may comprise a removable clamshell-type mechanism.

The touch screen may comprise at least a touch screen overlay and an LCD. The controller may be in communication with the touch screen, the LCD, and print mechanisms of the printer.

A layout of the touch screen overlay may be configurable. A partially translucent overlay may be provided between the touch screen overlay and the LCD, with permanent buttons being provided for controlling main printer functions on the partially translucent overlay outside of an area of the LCD.

The controller may comprise a printed circuit board mounted directly to a rear surface of the LCD. The touch screen may also comprise an SD micro card reader in communication with the controller.

A latching mechanism may be provided for securing the touch screen housing to the printer housing in a closed position. For example, the latching mechanism may comprise at least one magnet fixed to one of the touch screen housing or the printer housing and at least one corresponding metal striker plate fixed to the other of the touch screen housing or the printer housing.

A bracket may be provided which is adapted to be coupled to the printer housing for mounting the printer to a wall surface. The touch screen housing may be adapted to be pivoted open without extending beyond a back wall of the printer housing, to avoid interference issues when the printer housing is wall mounted.

The present invention also encompasses a printer having a tilting touch screen. In one example embodiment, such a printer having a tilting touch screen may comprise a printer housing, a touch screen housing, a touch screen located in the touch screen housing, means for pivotally connecting the touch screen housing to the printer housing, the printer housing defining an opening closable by the tilting touch screen, and a controller for controlling the printer in communication with the touch screen. The printer may also include additional features discussed above in connection with the various embodiments of the tilting touch screen.

The present invention also encompasses a method of providing a tilting touch screen for a printer. One example embodiment of the method may comprise the steps of providing a touch screen housing, providing a touch screen located in the touch screen housing, providing means for pivotally connecting the touch screen housing to a printer housing, the printer housing defining an opening closable by the tilting touch screen, and providing a controller for controlling the printer in communication with the touch screen.

The method may also include additional features discussed above in connection with the various embodiments of the tilting touch screen.

BRIEF DESCRIPTION OF THE DRAWINGS

The present invention will hereinafter be described in conjunction with the appended drawing figures, wherein like reference numerals denote like elements, and:

FIG. 10A shows a perspective view of an example embodiment of the printer with the touch screen tilted open, illustrating an example embodiment of a mechanism for tilting the touch screen;

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to a tilting touch screen for a printer and a printer having such a tilting touch screen. The present invention is applicable for use as a label printer for printing "freshness labels" for food product preparation and inventory storage.

Figure 1:
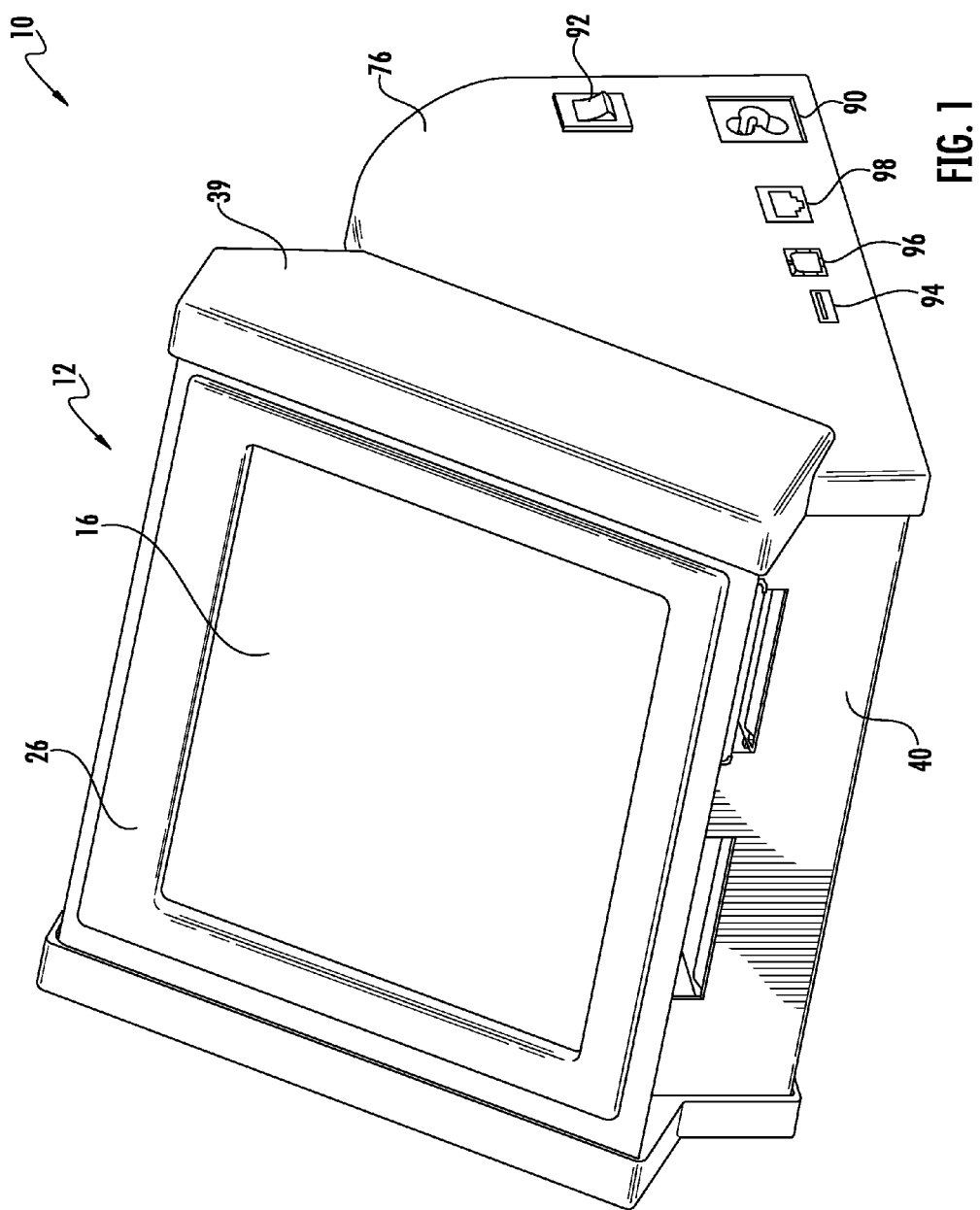
FIG. 1 shows an example embodiment of a printer in accordance with the present invention.

As shown generally in FIG. 1, the printer 10 may be provided with a touch screen 12. The touch screen 12 may be angled at an advantageous viewing angle for a typical table or wall mount installation. The printer may also be provided with adjustable feet or legs for adjusting the viewing angle when installed on a shelf or desk (e.g., screw type feet, fold out legs, or the like).

Figure 2:
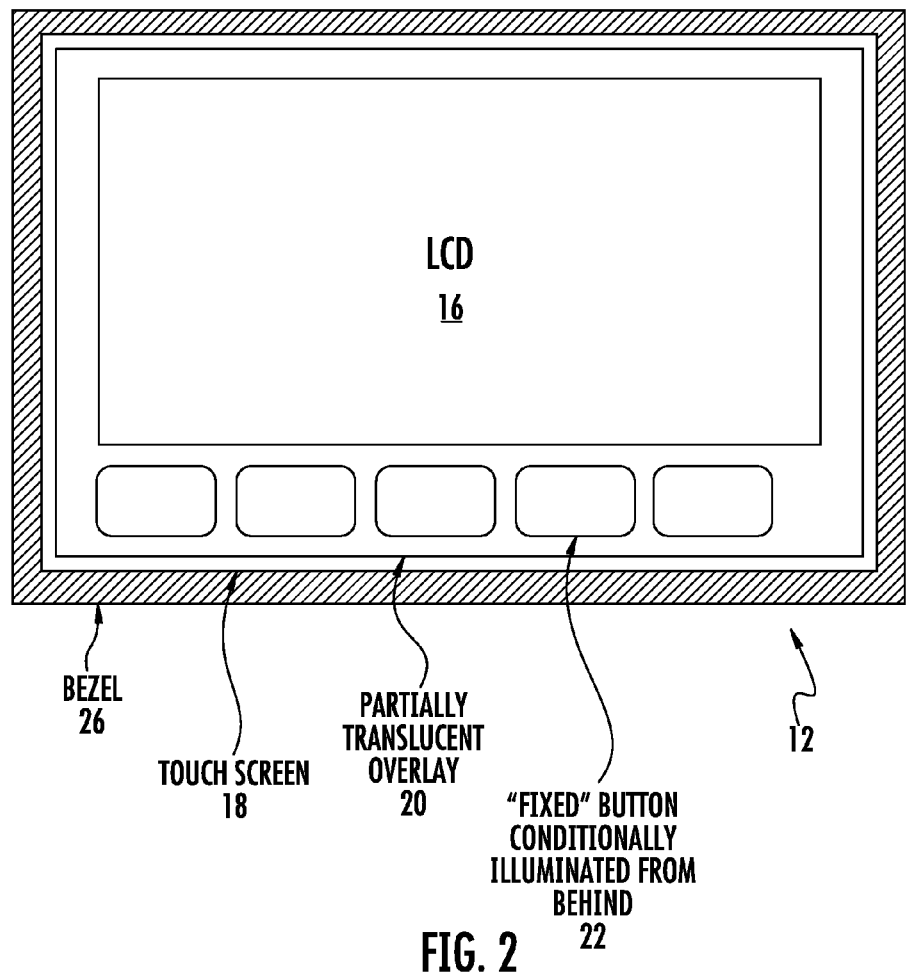
FIG. 2 shows a representation of a front view of an example embodiment of a touch screen in accordance with the present invention.
Figure 3:
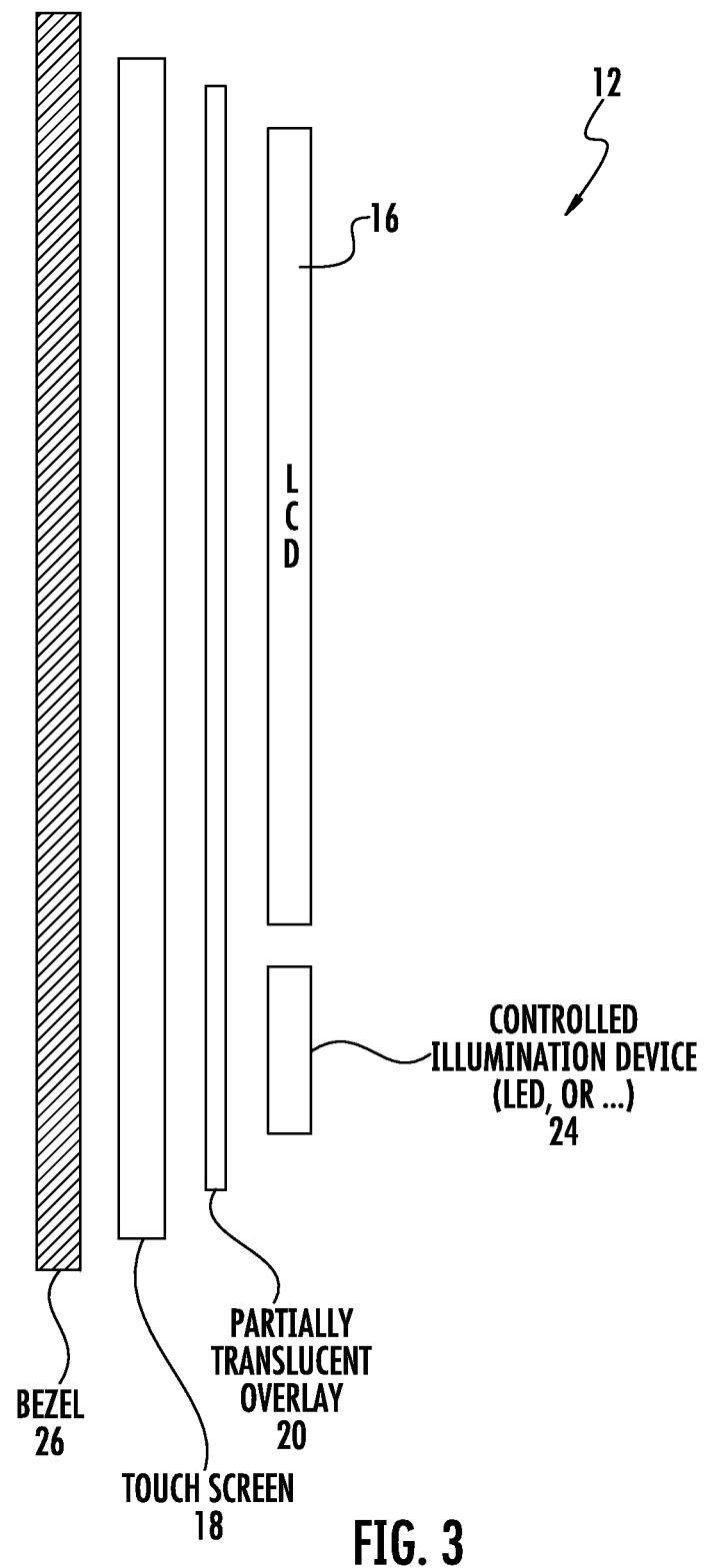
FIG. 3 shows a representation of a side view of an example embodiment of a touch screen in accordance with the present invention.

As shown in FIGS. 2 and 3, the touch screen 12 may comprise an LCD area 16 with a touch screen overlay 18. A partially translucent overlay 20 may be disposed between the LCD area 16 and the touch screen overlay 18. As can be seen in FIG. 2, touch screen overlay 18 may extend outside of the LCD area 16 so that permanent "fixed" buttons 22 may be provided for controlling main printer functions (on/off, label feed, setup, stop print, display statistics report, home button, and the like) underneath the touch screen overlay but outside of the LCD area (e.g., within the partially translucent layer). The partially translucent overlay 20 is transparent over the LCD area 16, translucent at the fixed buttons 22, and opaque everywhere else.

The fixed buttons 22 may be conditionally lit from behind by a controlled illumination device 24 (e.g., one or more LEDs or the like), which activates to indicate a certain state or feature of the button 22. A bezel 26 may surround the touch screen overlay 18.

Figure 4:
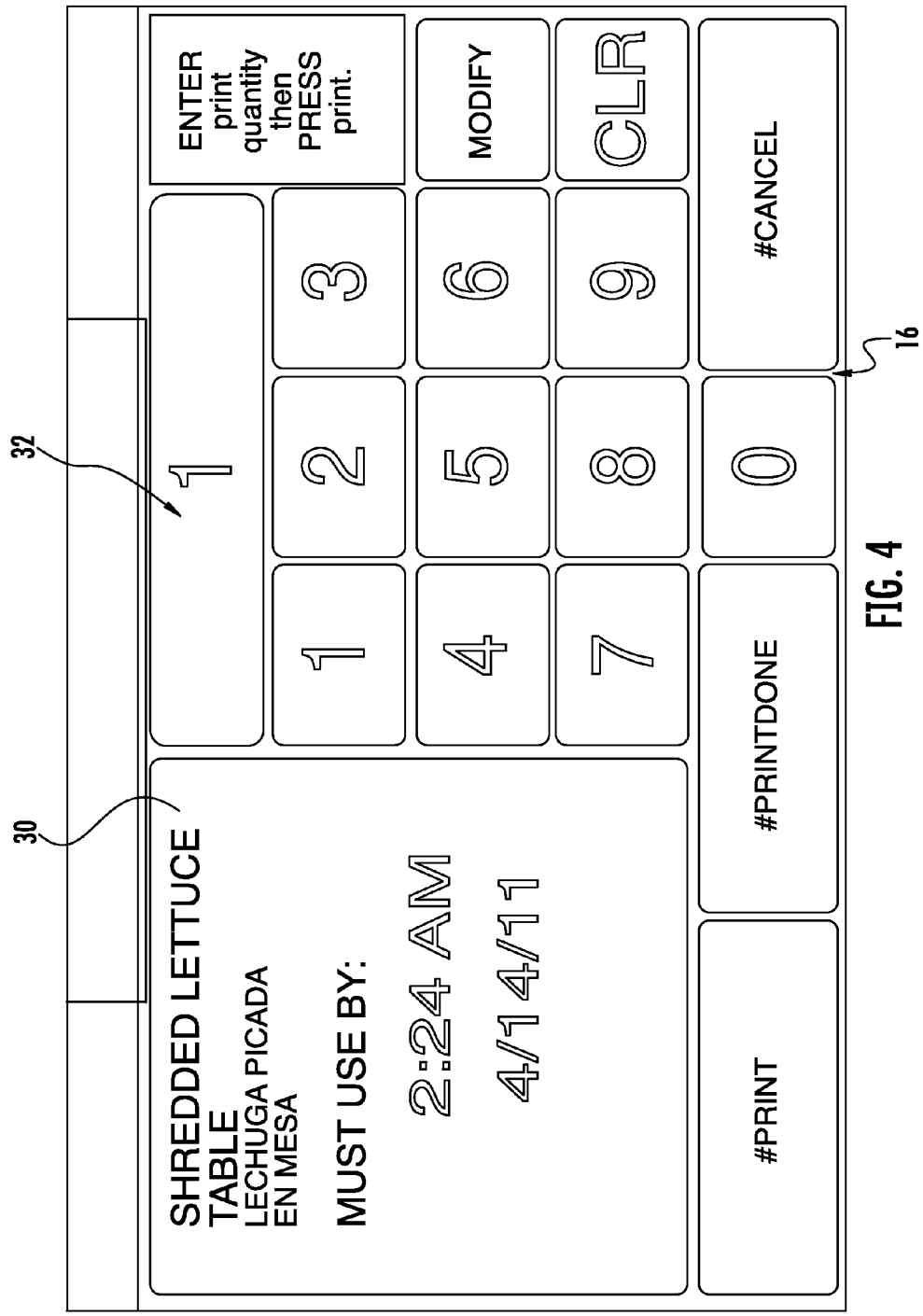
FIG. 4 shows an example embodiment of a screen layout of a touch screen in accordance with the present invention.

The touch screen 12 may be provided with a configurable layout of buttons in the LCD area 16 (see, e.g., FIG. 4). Each touch screen layout may be created in a standard drawing or graphics program such as Visio and saved, for example as a standard Visio file. Through the "properties" feature of the drawing program, each graphic (button or other screen element) is assigned a class (e.g., "button") with a related function call, so that when the button is pressed on the touch screen 12, an action is defined (i.e., bring up a further screen identified by the button, increment an amount, print preview, change settings/configuration, edit/add items, and the like). Attributes of the buttons and other screen elements, such as color, size, font of text, shape, and the like are also assigned via the drawing program.

Once created, each screen layout is saved in a standard file (e.g., Visio) and downloaded to an SD micro card, which can then be inserted into a corresponding card reader on the printer or LCD controller. Firmware in the printer contains a lookup table which relates the function calls to the desired actions for each button and processes the corresponding screen changes. The following are representative of function calls and corresponding functions or actions that may be provided:

| | |
|---|---|
| {"ScrollUpMain", ScrollUpMain,}, | → Advance display one screen |
| {"ScrollDownMain", ScrollDownMain,}, | → Go back one screen |
| {"DialogExit", DialogExit,}, | → Exit current dialog/screen |
| {"ChangeCategory", ChangeCategory,}, | → Change categorey |
| {"BrightnessUp", BrightnessUp,}, | → Increase screen brightness |
| {"BrightnessDown", BrightnessDown,}, | → Decrease screen brightness |
| {"CalibrateDialog", LCDCalibrate,}, | → Calibrate touch screen |
| {"SelfTestDialog", SelfTestDialog,}, | → Do a self test |
| {"SetLanguage", SetLanguage,}, | → Change language |
| {"GoHome", GoHome,}, | → Go to home screen |
| {"CharEntry", CharEntry,}, | → Enter character into memory |
| {"SetText", SetText,}, | → Set text of screen element |
| {"ReDraw", ReDraw,}, | → redraw the screen |
| {"SetFieldLen", SetFieldLen,}, | → Limit field/element length |
| {"IncVal", IncVal,}, | → Increment value of memory element |
| {"SetUpperLimit", SetUpperLimit,}, | → Limit hi value of memory/screen element |
| {"SetLowerLimit", SetLowerLimit,}, | → Limit lo value of memory/screen element |
| {"SetList", SetList,}, | → Set possible text values |
| {"Print", Print,}, | → Display print dialog/screen |
| {"SetData", SetData,}, | → Set memory element |
| {"InitPreview", InitPreview,}, | → Init/draw print preview |
| {"GoToPage", GoToPage,}, | → Go to page n of total |
| {NULL, NULL,} //end of table marker | → End of table marker |

In addition to invoking functions, parameters can be defined in Visio and passed to the corresponding function calls/invocations.

Thus, the screen layout is easily customizable by using a standard drawing program to manipulate each screen layout, and downloading the modified file to the printer. Once the screen layout file is downloaded to the printer, certain features of the screen may be further configurable via the touch screen itself, including button size, font selection, font size, and the like.

In addition, as shown in FIG. 4, a print preview 30 of the label to be printed may be provided in the LCD area 16 of the touch screen 12 alongside a touch screen keypad 32, providing the opportunity to view the label to be printed and input or modify information on the label to be printed (e.g., number of labels to be printed, expiration dates, or notes such as "Use First" or the like). Although FIG. 4 shows a numeric keypad 32, it should be appreciated that the touch screen can also be configured to show an alphabet keypad or an alphanumeric keypad.

The touch screen 12 may be adapted to be pivoted or tilted back to provide direct access to the inside of the printer, facilitating paper loading. In other words, the touch screen 12 comprises a cover for the printer housing 40, and opening of this cover gives access to the printer mechanism(s) and corresponding paper bucket(s).

Figure 5:
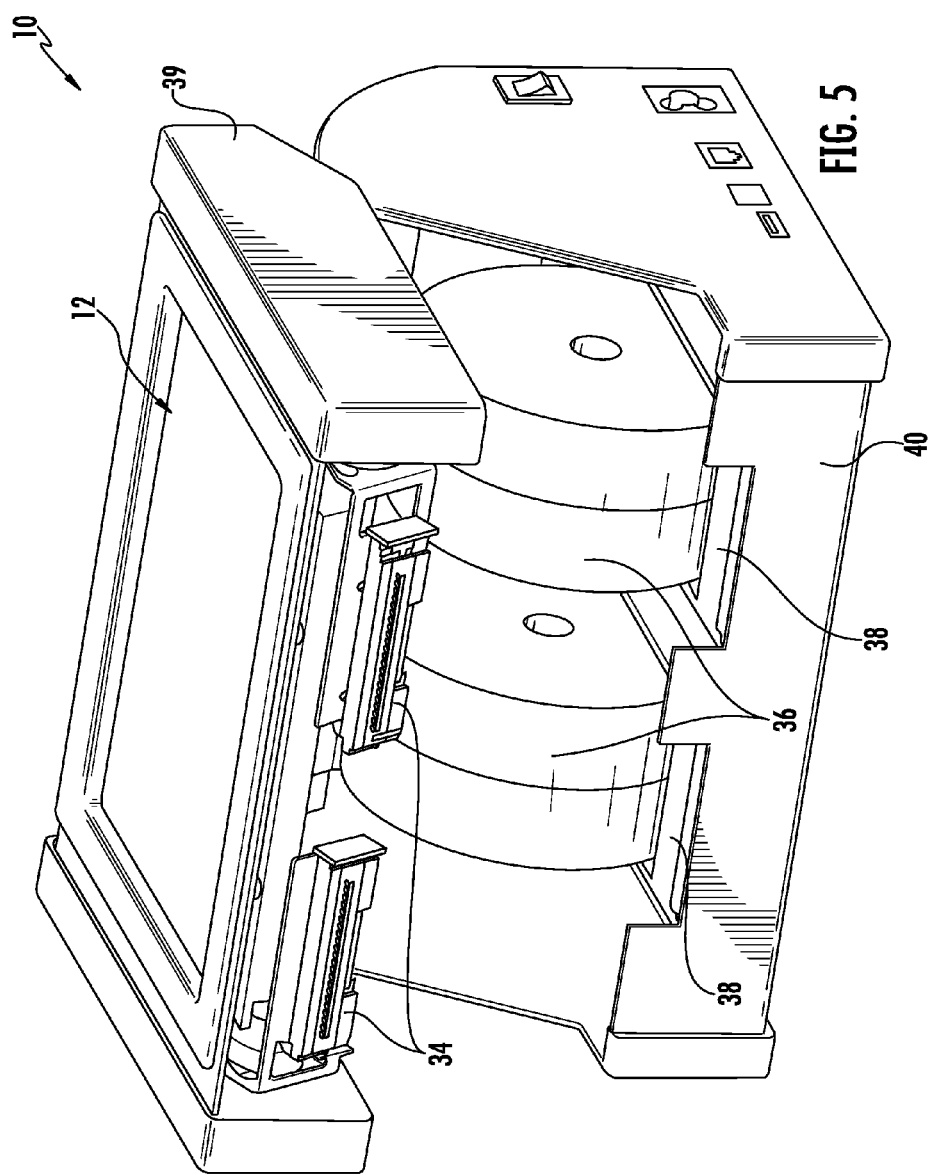
FIG. 5 shows a first example embodiment of a tilting touch screen in accordance with the present invention.
Figure 6:
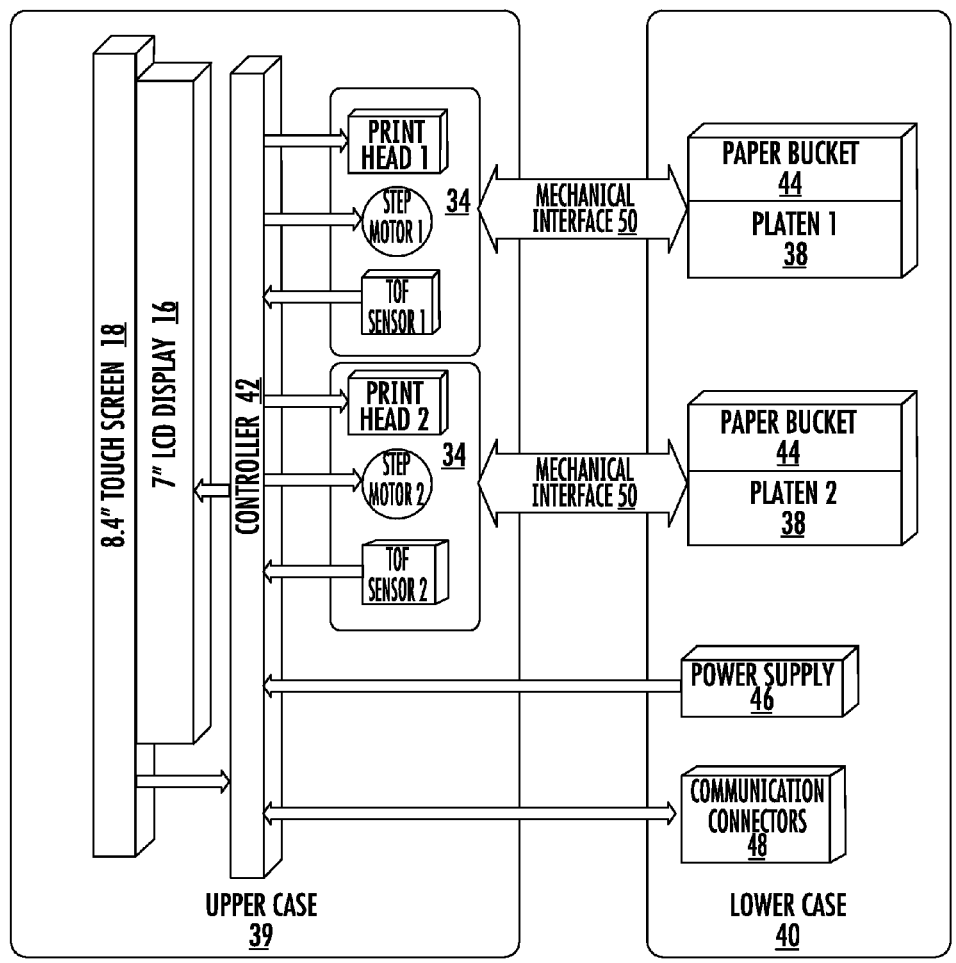
FIG. 6 shows a block diagram of the electronic architecture of the example embodiment of the touch screen of FIG. 5.

An example of a first embodiment of a label printer 10 with a tilting touch screen 12 in accordance with the present invention is shown in FIGS. 5 and 6. Although the Figures show a printer with two print mechanisms 34 and correspondingly separate paper rolls 36, it should be appreciated that the features of the present invention can easily be implemented in a printer 10 having a single print mechanism. In addition, it should be appreciated that the paper source could be in the form of fan-folded tickets, rather than a paper roll or rolls.

FIG. 5 shows the printer 10 with the touch screen 12 tilted into the open position. In this embodiment, the print mechanisms 34 are contained in the touch screen housing (upper case) 39 and tilt up with the touch screen 12. The platens 38 remain in the printer housing (lower case) 40.

FIG. 6 shows a block diagram of the electronic architecture of the printer 10 shown in FIG. 5. As can be seen in FIG. 6, the touch screen overlay 18 is mounted on the LCD display 16, and both the LCD display 16 and touch screen overlay 18 are in communication with the controller 42 (which may be, for example, a PCB mounted directly to the LCD Display 16). It is noted that FIG. 6 does not include the partially translucent overlay 20 of FIG. 3, as the partially translucent overlay 20 is not part of the electronic architecture of the printer 10.

The print heads, stepper motors, and top of form sensors for the corresponding print mechanisms 34 are also in communication with the controller 42. Each of the touch screen overlay 18, LCD Display 16, controller 42, and print mechanisms 34 are located in the touch screen housing 39.

The SD micro card reader may be located on or in the controller board 42 (or otherwise connected thereto).

The printer housing 40 contains the paper buckets 44 and platens 38 connected to the touch screen housing 39 and the corresponding components located therein via mechanical interfaces 50. The mechanical interfaces 50 may include guiding surfaces to orient the printheads into proper alignment with the printing platens. A spur gear transmission may be used to move power from the stepper motors to the platens.

The printer housing 40 may also contain a power supply 46, and communication connectors 48 (such as USB ports, Ethernet ports, memory card readers, and the like), each of which is connected to the controller 42.

In the embodiment shown in FIGS. 5 and 6, all active electronics are located on the main controller 42, which is mounted on the rear of the display module. The print heads, stepper motors, and sensors reside in the upper housing 39, while the printer housing 40 contains only passive mechanical components, such as the paper buckets 44 and platens 38. In the embodiment shown in FIG. 5, the print heads are easily accessible for cleaning when the upper housing 39 is tilted open.

Figure 7:
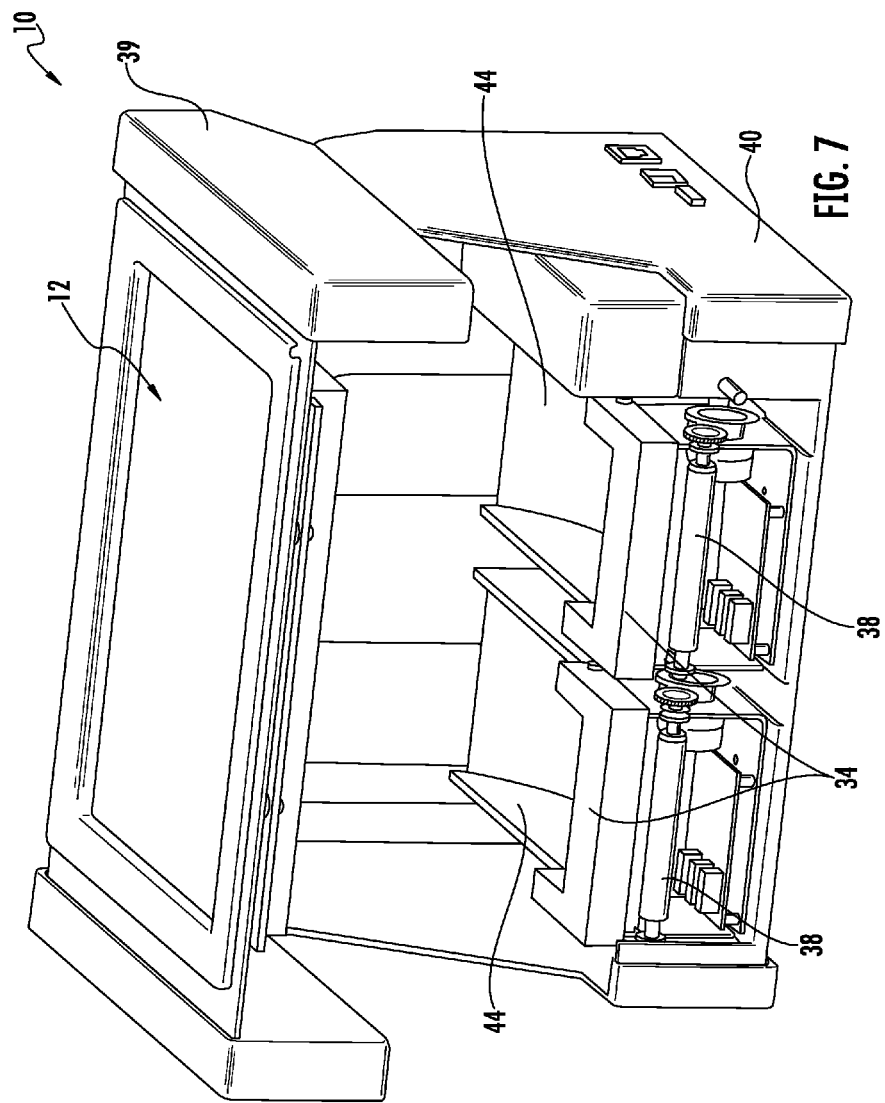
FIG. 7 shows a second example embodiment of a tilting touch screen in accordance with the present invention.
Figure 8:
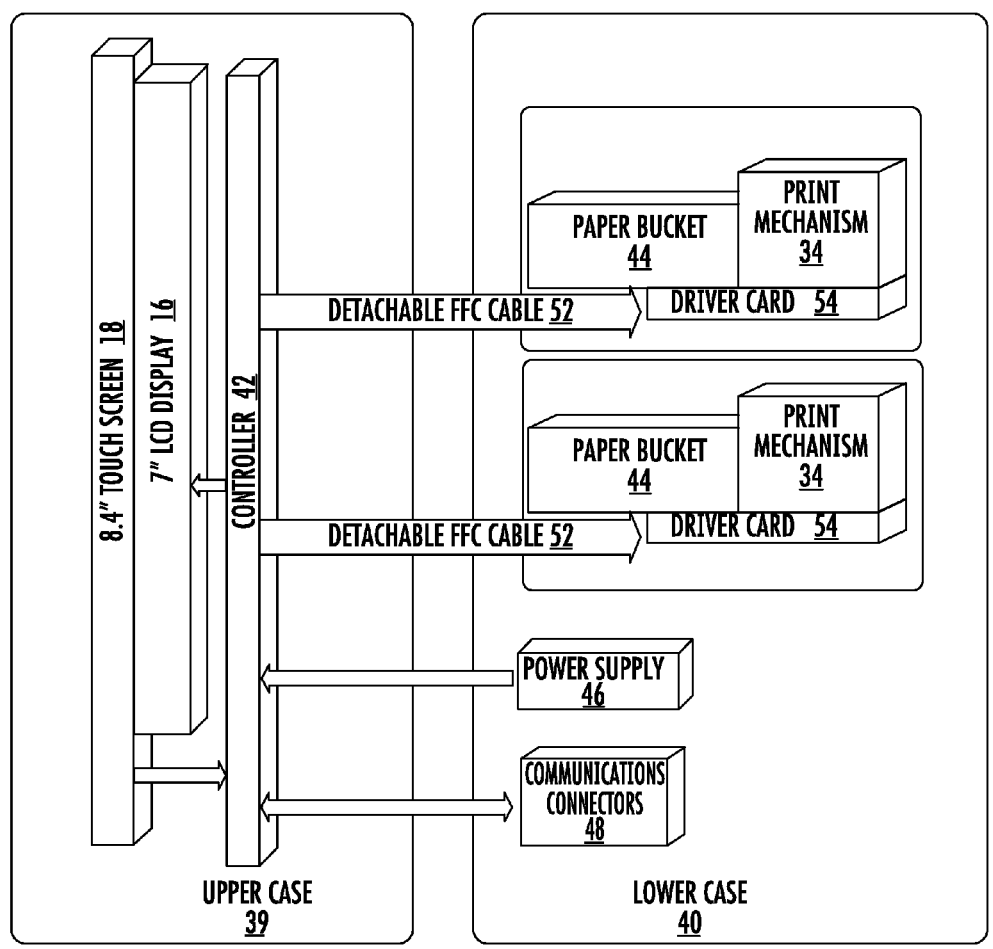
FIG. 8 shows a block diagram of the electronic architecture of the example embodiment of the touch screen of FIG. 7.

An example of a second embodiment of a label printer 10 with a tilting touch screen 12 in accordance with the present invention is shown in FIGS. 7 and 8. Unlike the example embodiment described above in connection with FIGS. 5 and 6, in the example embodiment shown in FIGS. 7 and 8, the print mechanisms 34 do not tilt with the touch screen 12 and instead remain in the printer housing 40.

FIG. 8 shows a block diagram of the electronic architecture of the printer 10 shown in FIG. 7. As in the FIG. 6 embodiment, the touch screen overlay 18 is mounted on the LCD display 16, and both the LCD display 16 and touch screen overlay 18 are in communication with the controller 42 (which may be, for example, a PCB mounted directly to the LCD Display 16). It is noted that FIG. 8 does not include the partially translucent overlay 20 of FIG. 3, as the partially translucent overlay 20 is not part of the electronic architecture of the printer 10.

However, unlike the FIG. 6 embodiment, as shown in FIG. 8 the print mechanisms 34 (including platen 38) are located in the printer housing 40 with the paper buckets 44. A driver card 54 associated with the print mechanisms 34 may be provided which is in communication with the controller 42 via detachable flexible flat cables (FFC cables) 52.

In the example embodiment shown in FIGS. 7 and 8, the main controller 42 is mounted on the rear of the display module and includes logic outputs for driving the printer.

The print mechanisms 34 may be removable clamshell type print mechanisms mounted in the printer housing 40. Only logic signals and raw power are sent over the FFC cables 52 from the controller 42 to the driver cards 54 to drive the print mechanisms 34.

Figure 9:
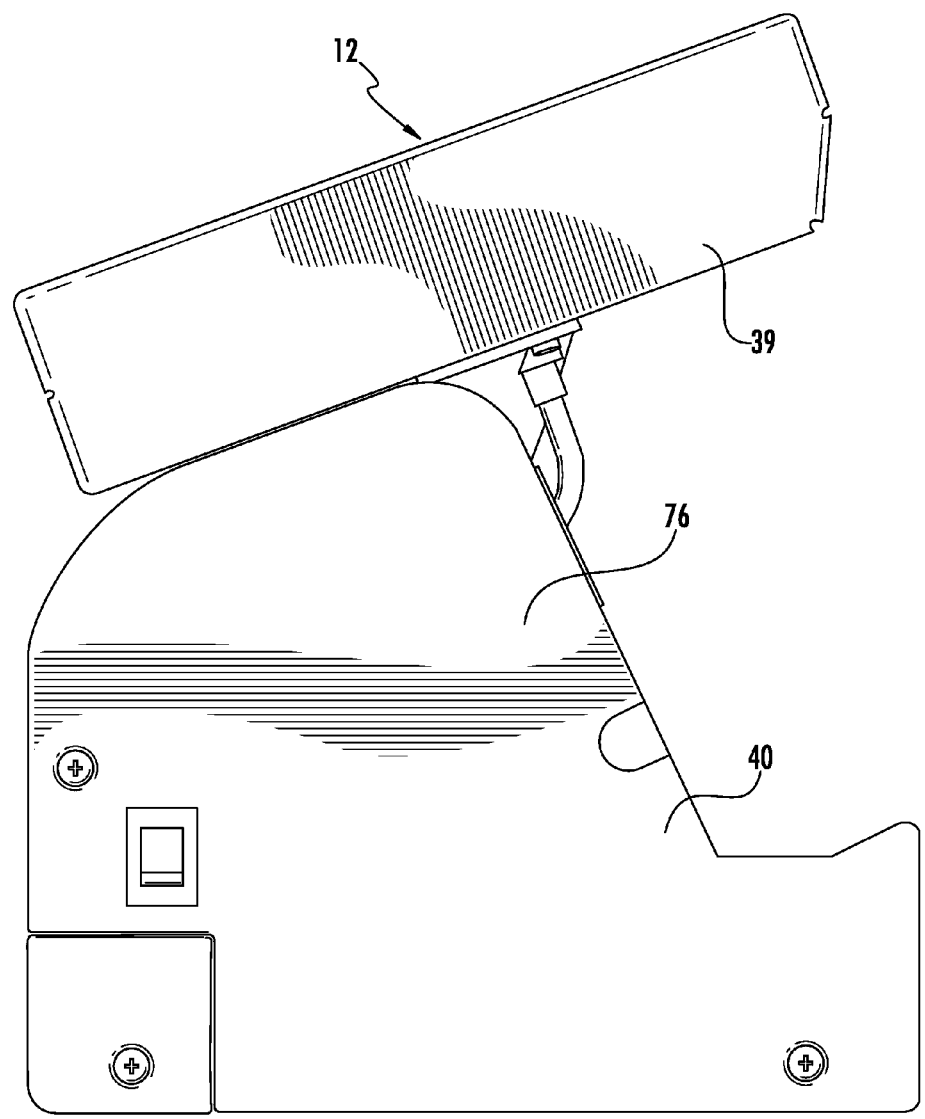
FIG. 9 shows a side view of an example embodiment of a printer with the touch screen tilted open in accordance with the present invention.

FIG. 9 shows a side view of the example embodiment of printer 10 shown in FIGS. 7 and 8. As can be seen in FIG. 9, the screen 12 when tilted does not extend beyond the back of the printer housing 40, so that there is no interference with a mounting surface when wall mounted. Thus, the present invention enables flush mounting of the printer 10 against a wall, while still enabling full opening of the tilting screen 12 for direct access to the print mechanisms 34 and paper buckets 44 for service or paper loading, without requiring the removal of any additional covers.

FIG. 10A shows a perspective view of the printer with the touch screen 12 tilted into the open position. The touch screen housing 39 may be pivotally connected to the printer housing 40 by various means. As shown for example in FIG. 10A, the means may comprise pivot arms 41 fixed to the housing 39. For example, an upper portion 37 of the pivot arm 41 may be secured to the inside of the housing 39 (i.e., via screws or bolts) on opposite sides of the housing. The pivot arm 41 may be pivotally secured to the printer housing 40 at a central pivot point 43 (e.g., via a pin, bolt, a recess and corresponding protrusion on the housing side panel 76 and arm 41, or the like). A free end 45 of each arm 41 is resilient and has a protrusion adapted to springingly engage with or snap into corresponding recesses or pockets 47, 49 provided in each side panel 76 of the printer housing 40. When the touch screen 12 is tilted open as shown in FIG. 10A, the free end 45 of the arm 41 snaps into the lower recess 47. When the touch screen is tilted down into the closed position, the free end 45 of the arm 41 snaps into the upper recess 49.

Figure 10B:
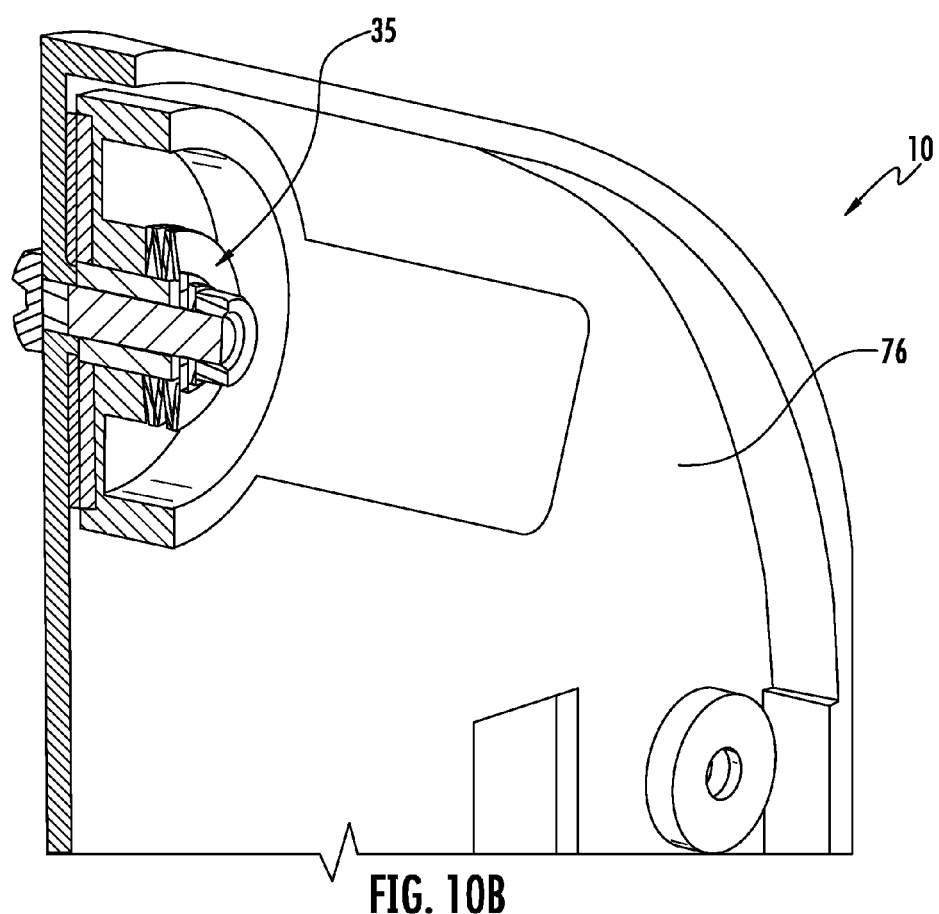
FIG. 10B shows a partial perspective view of a example embodiment of the printer with the touch screen tilted open, illustrating a further example embodiment of a mechanism for tilting the touch screen.
Figure 10D:
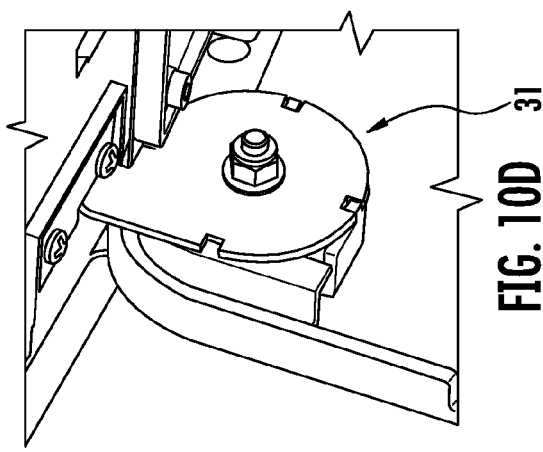
FIG. 10D shows an exploded view of the mechanism of FIG. 10C
Figure 10C:
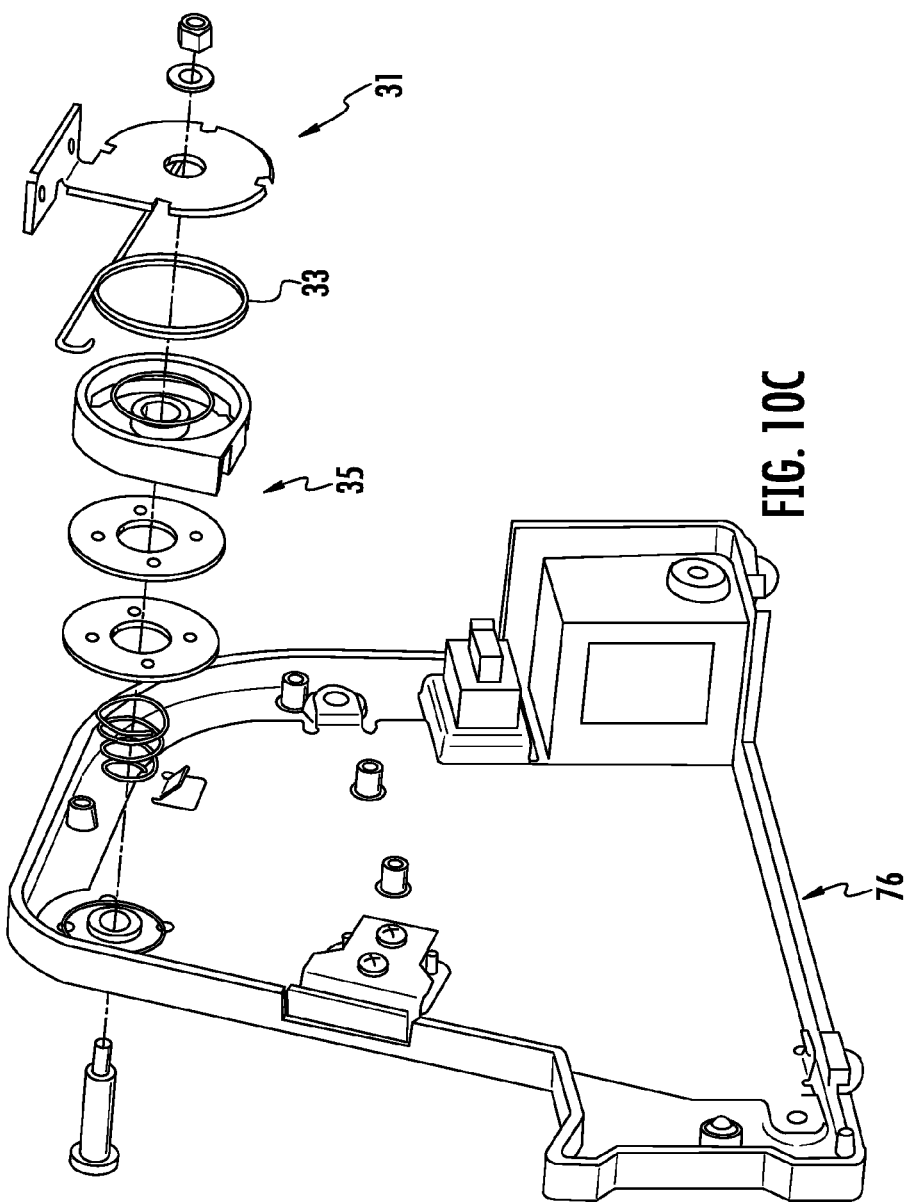
FIG. 10C shows a further example embodiment of a mechanism for tilting the touch screen.

Other conceivable means for enabling tilting of the touch screen 12 are conceivable and within the purview of the present invention. For example, the weight of the touch screen 12 may be supported by a torsion spring which will ease opening. As shown in FIG. 10B, the means may comprise a friction clutch assembly 35, which serves to dampen the movement of the touch screen 12 (not shown in FIG. 10B) during opening and closing. FIGS. 10C and 10D show an example embodiment where the means comprises counterbalancing friction hinges 31 which include a clutch assembly 35 having a torsion spring 33. Two oppositely disposed counterbalancing friction hinges 31 may be provided on either side of the touch screen housing 39 and fixed to the housing side panels 76 of the printer housing 40.

Figure 11:
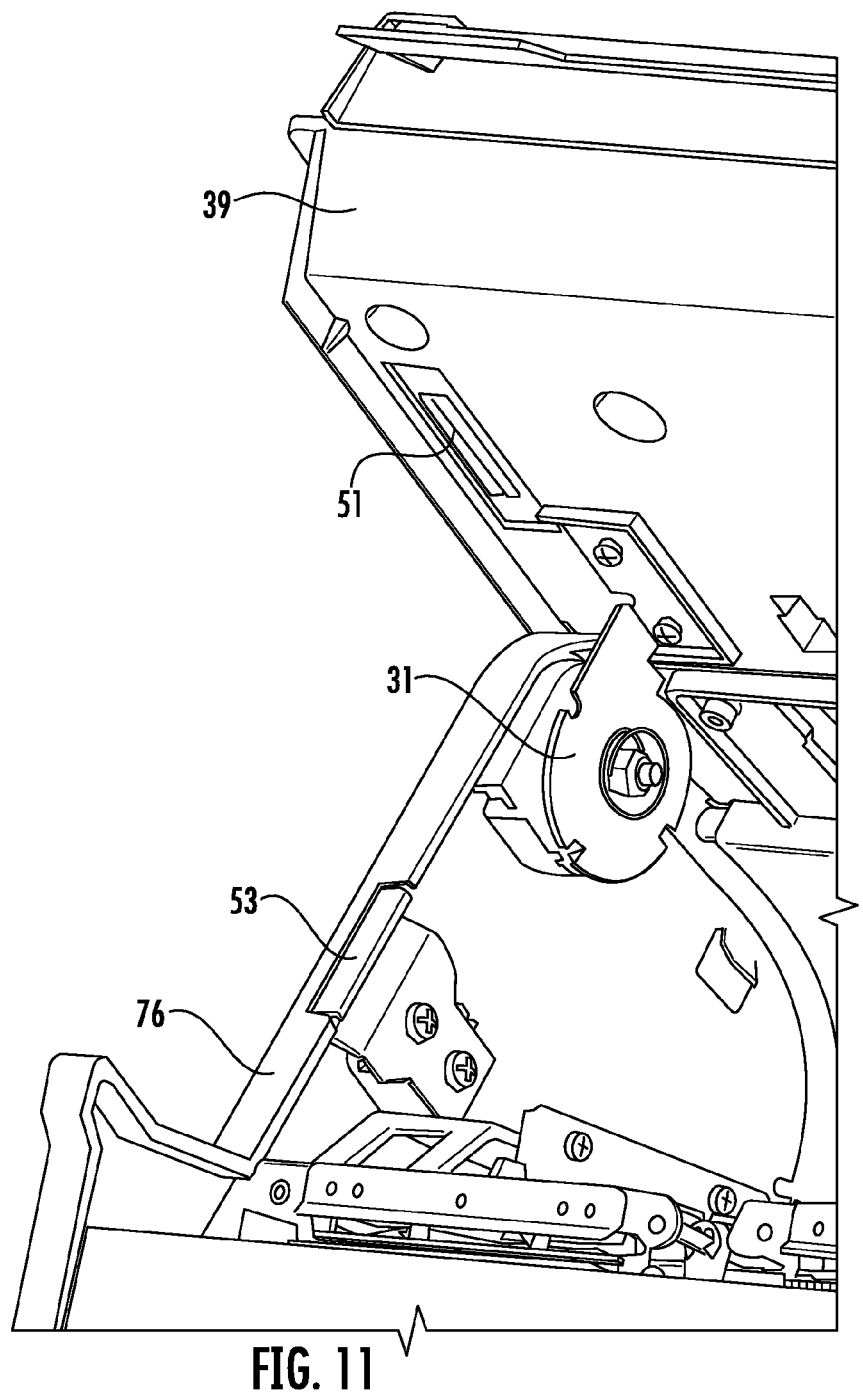
FIG. 11 shows an example embodiment of a latching mechanism for the touch screen housing.

A more positive latching mechanism may be used to ensure a positive feel when pushing the touch screen housing 39 into the closed position. For example, as shown in FIG. 11, the latching mechanism may comprise a magnet 51 and a corresponding metal striker plate 53. FIG. 11 shows the magnet 51 arranged on a side of the inside of the touch screen housing 39 and a corresponding striker plate 53 on the housing side panel 76. A similar arrangement may be provided on both sides of the printer housing 40. One skilled in the art will appreciate that a single magnet and striker plate arrangement may be used or that the location may be changed. Further, it should be appreciated that the magnet 51 may be arranged on the housing side panel 76 and the striker plate 53 may be arranged on the touch screen housing 39.

As can be seen in FIG. 1, the power cord receptacle 90 and on-off switch 92 may be mounted to the printer housing 40. A USB A port 94, USB B port 96, and Ethernet connection 98 may also be positioned in the printer housing 40 and connected to the controller board 42. Additional ports (USB A and B, mini-USB and the like) may also be provided. Alternatively, these ports (e.g., USB A port 94, Ethernet port 98, and others) may be mounted directly to the controller board 42 through the touch screen housing 39. For example, FIG. 13 shows a slideable cover 95 in the touch screen housing 39 covering the various ports.

Figure 12:
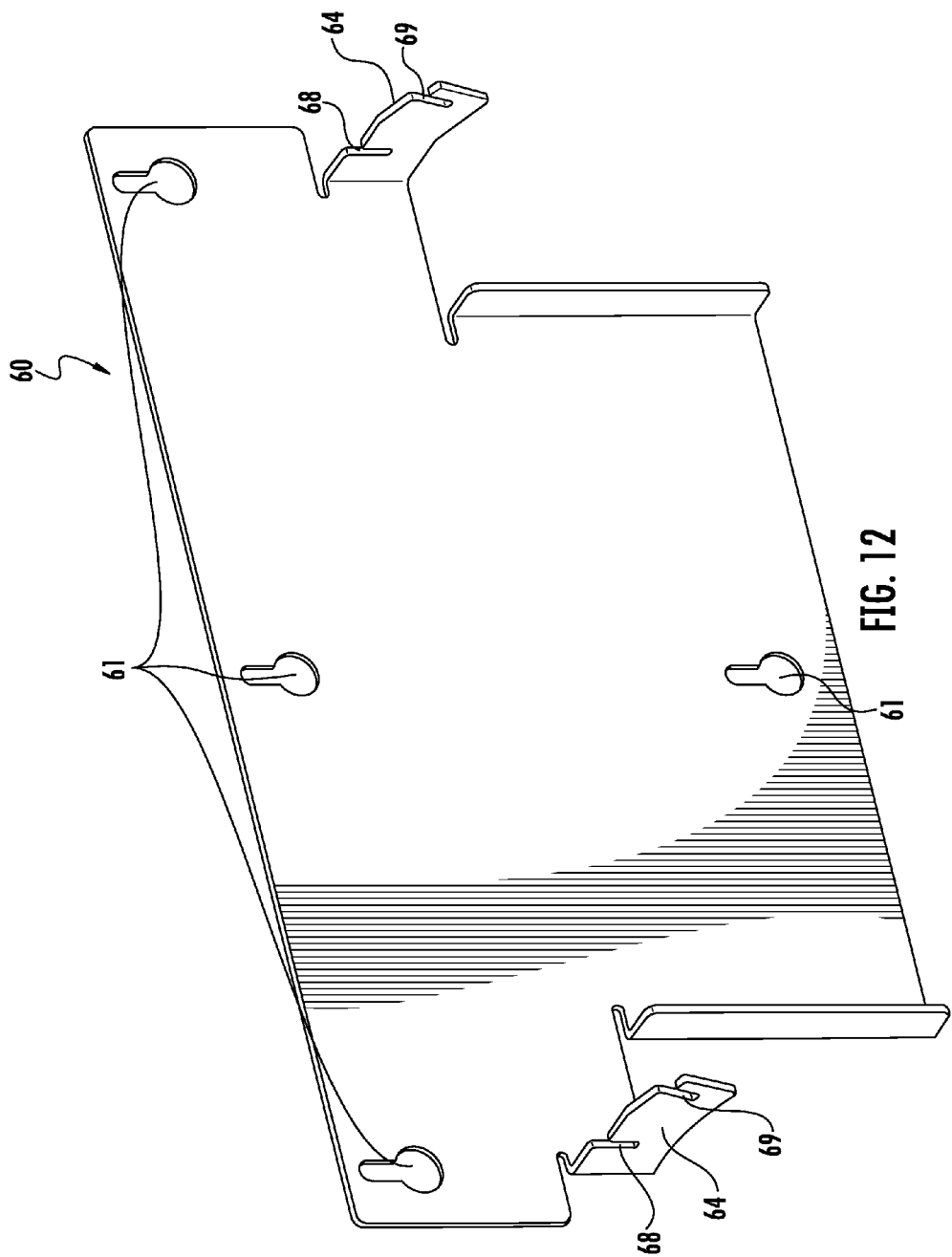
FIG. 12 shows an example embodiment of a wall bracket for a printer in accordance with the present invention.

FIGS. 12-16 show an example embodiment of a bracket 60 for mounting the printer 10 to a wall surface. FIG. 12 shows the bracket 60 unconnected to the printer housing 40. The mounting bracket 60 is flat and designed for flush mounting of the printer 10 to a wall surface. The bracket 60 also enables the printer 10 to be mounted in two different positions on the bracket 60 so that the viewing angle of the touch screen 12 can be adjusted, as discussed in detail below. The bracket 60 is provided with through holes 61 for mounting screws for mounting the bracket to the wall.

An arm 64 extends from each side of the bracket 60. The arms 64 may be provided with two slots 68 and 69 each. The arms 64 extend though slots 70 in the rear of the printer housing 40.

Figure 13:
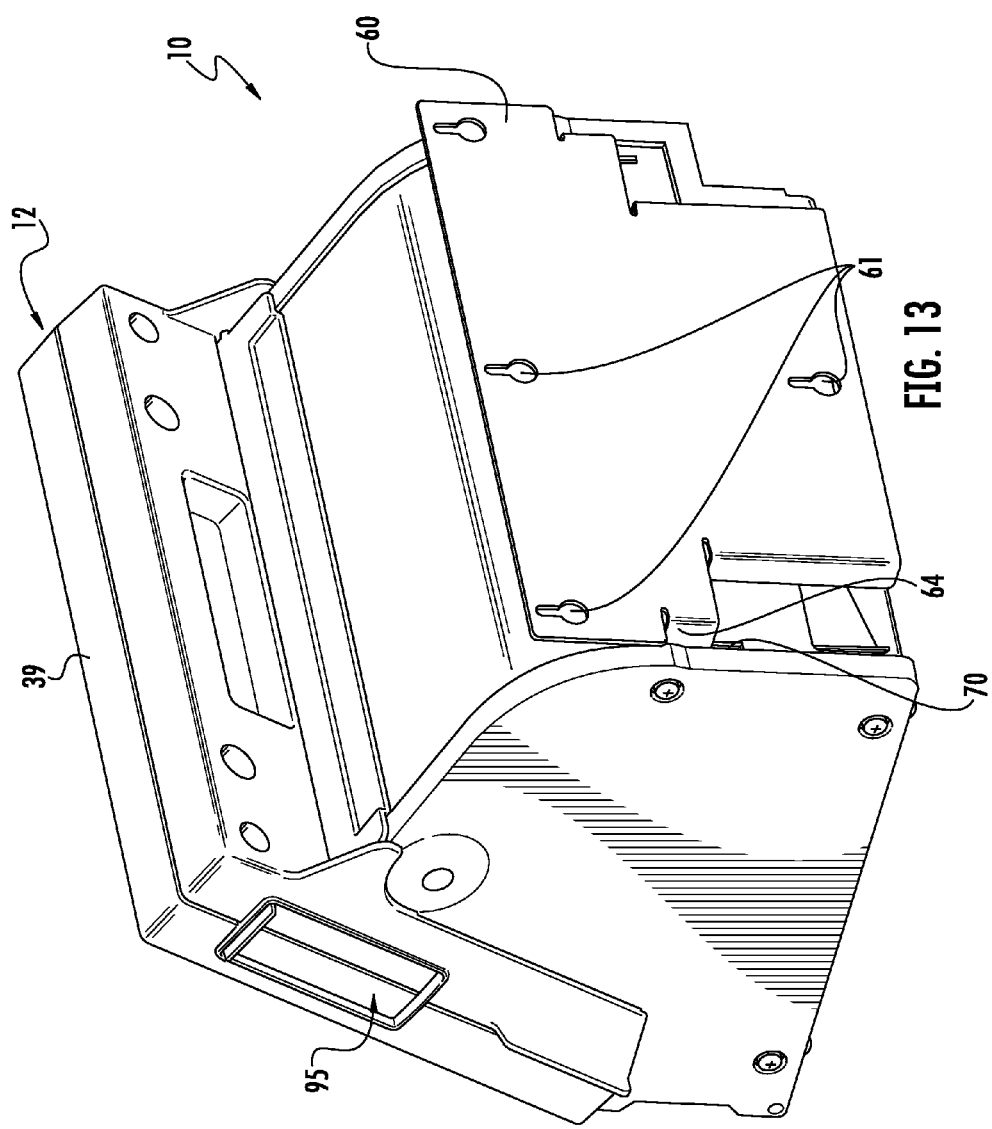
FIG. 13 shows a rear perspective view of the wall bracket of FIG. 12 connected to the printer in a first position in accordance with the present invention.
Figure 14:
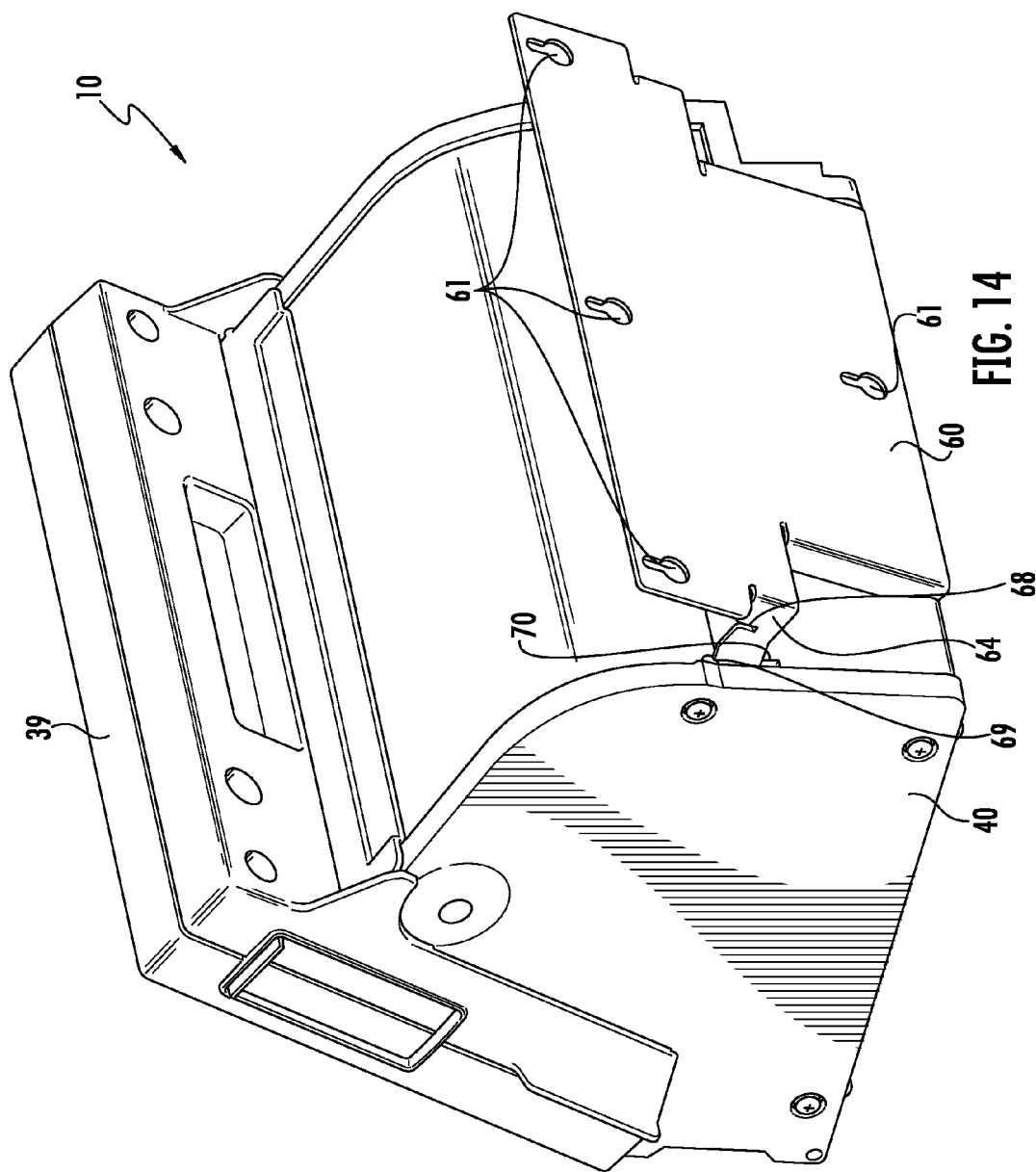
FIG. 14 shows a rear perspective view of the wall bracket of FIG. 12 connected to printer in a second position.

FIG. 13 shows the printer 10 in a "full back" position where the printer 10 is positioned in slots 68 of arms 64 of the bracket 60. FIG. 14 shows the printer in a "full forward" position where the printer 10 is positioned in slots 69 of arms 64 of the bracket 60. This full forward position may position the printer at an angle with respect to the full back position, for example of approximately 30 degrees. It should be appreciated that additional positions and/or viewing angles may be provided by providing additional slots in arms 64 and/or by changing the length of the arms of the positions of the slots.

Figure 15:
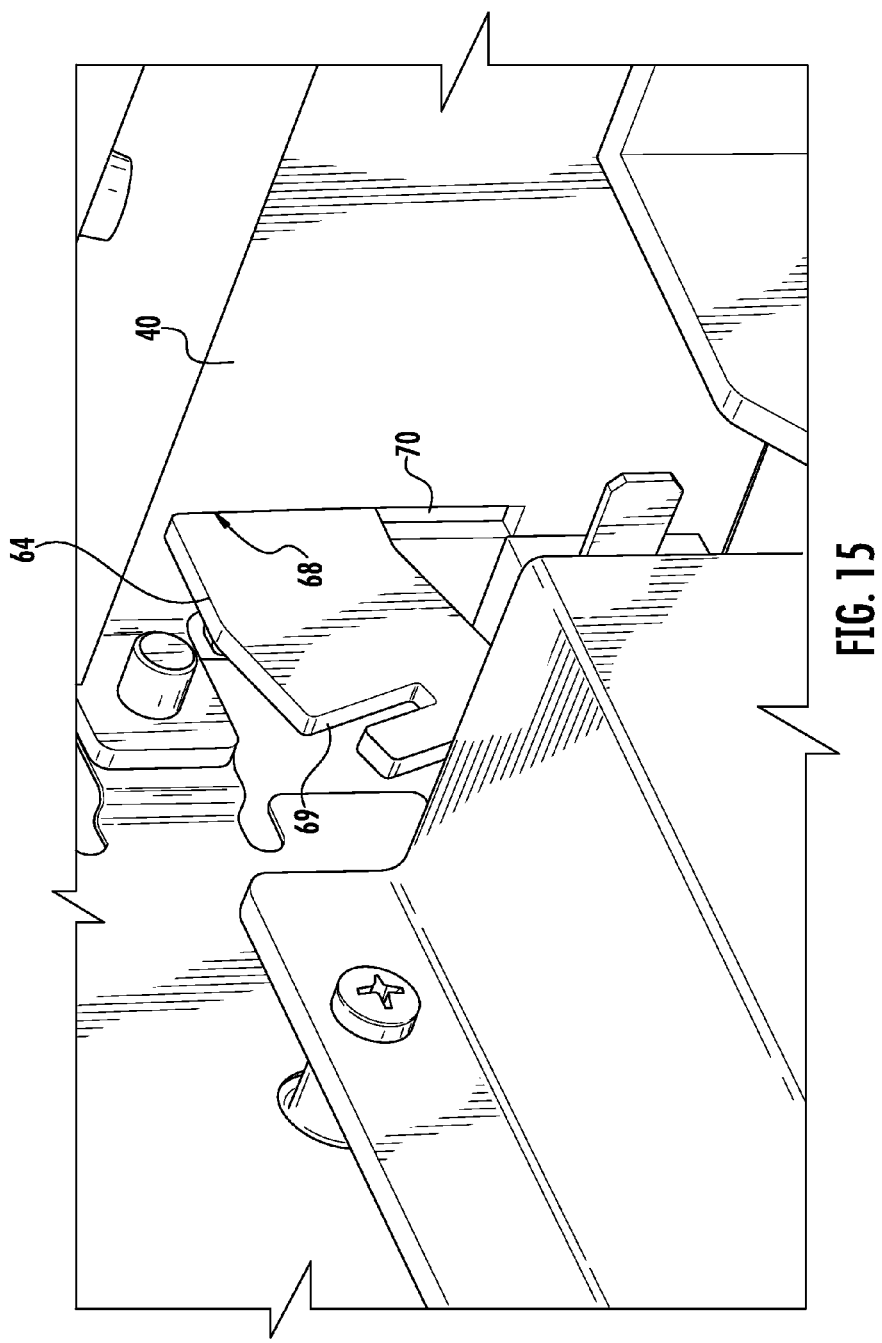
FIG. 15 shows a close-up view of the interior connections between the bracket and the printer in the first position shown in FIG. 13.
Figure 16:
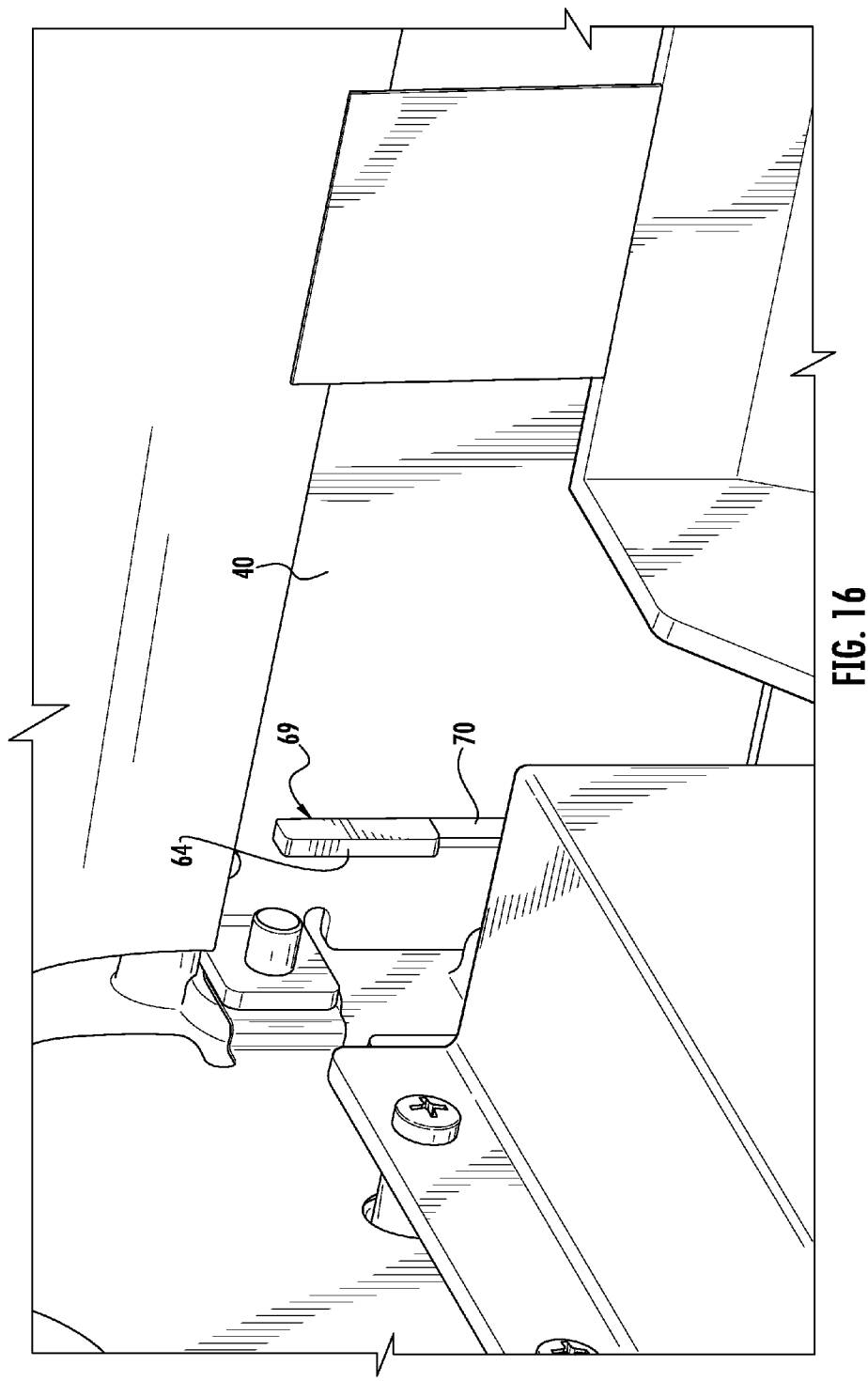
FIG. 16 shows a close-up view of the interior connections between the bracket and the printer in the second position shown in FIG. 14.

FIGS. 15 and 16 show the arms 64 extending through slots 70 into the interior of the printer 10 in the full back position and full forward position, respectively. As can be seen from FIG. 15, in the full back position, the printer 10 sits in slots 68 of arms 64. As can be seen from FIG. 16, in the full forward position, the printer 10 sits in slots 69 of arms 64. Thus, the printer can easily be installed on the bracket by aligning the slots 70 in the housing with the arms 64, moving the printer towards the bracket 60 until the rear of the printer housing 40 is in alignment with the desired slots 68 or 69, and lowering the printer 10 into the desired slots 68 or 69. Removal of the printer 10 from the bracket 60 for servicing or re-positioning is the reverse process and entails simply lifting the printer 10 out of the slots and pulling the printer 10 away from the bracket 60 until the arms 64 of the bracket are free of the printer housing 40.

Those skilled in the art will appreciate that various styles of brackets and arms may be used to mount the printer to the wall, including brackets with various positioning and adjustment options, brackets which enable pivoting of the printer with respect to the wall (in defined increments or at any position within an angel range), and the like.

Although the present invention has been described in connection with a label printer for printing freshness labels, the present invention is also easily adapted for use in other environments, including but not limited to as a label printer for a deli counter of a grocery store, as a label printer for a grill or beverage area of a fast-food restaurant, as a point-of-sale receipt printer, a barcode printer for inventory control and tracking, or the like. The printer can also be coupled with a scale through a USB interface. The system could then be used for weighing and labeling any kind of bulk goods.

It should now be appreciated that the present invention provides a food preparation printer with advantageous features, including but not limited to a small footprint, an easily configurable touch screen, easy serviceability, simplified paper loading, flush mounting, adjustable touch screen viewing angles, and more.

Although the invention has been described in connection with various illustrated embodiments, numerous modifications and adaptations may be made thereto without departing from the spirit and scope of the invention as set forth in the claims.

What is claimed is:

1. A tilting touch screen for a printer, comprising:
a touch screen housing;
a touch screen arranged in the touch screen housing, the touch screen comprising at least a touch screen overlay and an LCD;
means for pivotally connecting the touch screen housing directly to a printer housing, the printer housing defining an opening closable by the touch screen housing; and
a controller for controlling the printer in communication with the touch screen, the LCD, and print mechanisms of the printer;
wherein:
the touch screen housing is a cover for the opening of the printer housing;
the touch screen is accessible when the cover is closed;
a layout of the touch screen overlay is configurable; and
a partially translucent overlay is provided between the touch screen overlay and the LCD, permanent buttons being provided for controlling main printer functions on an area of the partially translucent overlay which extends outside of an area of overlap of the LCD.

2. The tilting touch screen of claim 1, wherein the means for pivotally connecting the touch screen housing to the printer housing comprises:
pivot arms pivotally coupling the touch screen housing to oppositely disposed inside surfaces of the printer housing at corresponding pivot points;
wherein:
the pivot arms each having a free end which extends beyond the corresponding pivot point;
the free ends of the pivot arms are resilient;
each of the free ends of the pivot arms bears a corresponding protrusion;
each of the free ends of the pivot arms with the corresponding protrusion is adapted to springingly engage into corresponding recesses in the oppositely disposed inside surfaces of the printer housing upon tilting of the touch screen into at least one of a fully open and a fully closed position; and
the protrusion is adapted to be released from engagement with the corresponding recess upon tilting of the touch screen from the at least one of the fully open and the fully closed position.

3. The tilting touch screen of claim 2, wherein:
upper and lower recesses are provided on the oppositely disposed inside surfaces of the printer housing;
the free ends of the arms with the corresponding protrusions spring into the lower recesses when the touch screen is tilted into the fully open position;
the free ends of the arms with the corresponding protrusions spring into the upper recesses when the touch screen is tilted into the fully closed position.

4. The tilting touch screen of claim 1, wherein the means for pivotally connecting the touch screen housing to the printer housing comprises counterbalanced friction hinges coupling the touch screen housing to oppositely disposed inside surfaces of the printer housing.

5. The tilting touch screen of claim 4, wherein the counterbalanced friction hinges comprise a torsion spring and a friction clutch assembly.

6. The tilting touch screen of claim 1, further comprising at least one print mechanism located in the tilting screen housing and in communication with the controller, each of the at least one print mechanisms comprising a print head, a stepper motor, and a top-of-form sensor.

7. The tilting touch screen of claim 6, wherein a platen associated with each of the at least one print mechanisms is located in the printer housing.

8. The tilting touch screen of claim 7, further comprising a mechanical interface between the at least one print mechanism and the platen.

9. The tilting touch screen of claim 8, the mechanical interface further comprising at least one guiding surface for orienting the at least one print head with the platen.

10. The tilting touch screen of claim 6, wherein a paper bucket associated with each of said at least one print mechanisms is located in the printer housing and accessible upon tilting the touch screen into an open position.

11. The tilting touch screen of claim 10, wherein the paper bucket is configured to receive one of a roll of paper or a fan-folded length of paper feedable to the at least one print mechanism.

12. The tilting touch screen of claim 1, wherein:
at least one print mechanism and at least one associated platen are located in the printer housing; and
the at least one print mechanism is adapted to be connected to the tilting touch screen via detachable flexible flat cables.

13. The tilting touch screen of claim 12, wherein a driver card associated with the at least one print mechanism is in communication with the controller via the detachable flexible flat cable.

14. The tilting touch screen of claim 13, wherein the controller comprises a logic output adapted to be directed through the detachable flexible flat cable to the driver card to drive the printer.

15. The tilting touch screen of claim 12, wherein the at least one print mechanism comprises a removable clamshell-type mechanism.

16. The tilting touch screen of claim 12, wherein a paper bucket associated with each of said at least one print mechanisms is located in the printer housing and accessible upon tilting the touch screen into an open position.

17. The tilting touch screen of claim 16, wherein the paper bucket is configured to receive one of a roll of paper and a fan-folded length of paper feedable to the at least one print mechanism.

18. The tilting touch screen of claim 1, wherein the controller comprises a printed circuit board mounted directly to a rear surface of the LCD.

19. The tilting touch screen of claim 1, further comprising an SD micro card reader in communication with the controller.

20. The tilting touch screen of claim 1, further comprising a latching mechanism for securing the touch screen housing to the printer housing in a closed position.

21. The tilting touch screen of claim 20, wherein the latching mechanism comprises at least one magnet fixed to one of the touch screen housing or the printer housing and at least one corresponding metal striker plate fixed to the other of the touch screen housing or the printer housing.

22. The tilting touch screen of claim 1, wherein:
a bracket is provided which is adapted to be coupled to the printer housing for mounting the printer to a wall surface; and
the touch screen housing is adapted to be pivoted open without extending beyond a back wall of the printer housing, to avoid interference issues when the printer housing is wall mounted.

23. A method of providing a tilting touch screen, comprising the steps of:
providing a touch screen housing;
providing a touch screen arranged in the touch screen housing, the touch screen comprising at least a touch screen overlay and an LCD;
providing means for pivotally connecting the touch screen housing directly to a printer housing, the printer housing defining an opening closable by the touch screen housing; and
providing a controller for controlling the printer in communication with the touch screen, the LCD, and print mechanisms of the printer;
wherein:
the touch screen housing is a cover for the opening of the printer housing;
the touch screen is accessible when the cover is closed;
a layout of the touch screen overlay is configurable; and
a partially translucent overlay is provided between the touch screen overlay and the LCD, permanent buttons being provided for controlling main printer functions on an area of the partially translucent overlay which extends outside of an area of overlap of the LCD.

24. A printer having a tilting touch screen, comprising:
a printer housing;
a touch screen housing;
a touch screen arranged in the touch screen housing, the touch screen comprising at least a touch screen overlay and an LCD;
means for pivotally connecting the touch screen housing directly to the printer housing, the printer housing defining an opening closable by the touch screen housing; and
a controller for controlling the printer in communication with the touch screen, the LCD, and print mechanisms of the printer;
wherein:
the touch screen housing is a cover for the opening of the printer housing;
the touch screen is accessible when the cover is closed;
a layout of the touch screen overlay is configurable; and
a partially translucent overlay is provided between the touch screen overlay and the LCD, permanent buttons being provided for controlling main printer functions on an area of the partially translucent overlay which extends outside of an area of overlap of the LCD.

25. A tilting touch screen for a printer, comprising:
a touch screen housing;
a touch screen arranged on an outside of the touch screen housing;
means for pivotally connecting the touch screen housing directly to a printer housing, the printer housing defining an opening closable by the tilting touch screen; and
a controller for controlling the printer in communication with the touch screen;
wherein:
the touch screen housing comprises a cover for the opening of the printer housing;
the means for pivotally connecting the touch screen housing to the printer housing comprises pivot arms pivotally coupling the touch screen housing to oppositely disposed inside surfaces of the printer housing at corresponding pivot points;
the pivot arms each having a free end which extends beyond the corresponding pivot point;
the free ends of the pivot arms are resilient;
each of the free ends of the pivot arms bears a corresponding protrusion;
each of the free ends of the pivot arms with the corresponding protrusion is adapted to springingly engage into corresponding recesses in the oppositely disposed inside surfaces of the printer housing upon tilting of the touch screen into at least one of a fully open and a fully closed position; and
the protrusion is adapted to be released from engagement with the corresponding recess upon tilting of the touch screen from the at least one of the fully open and the fully closed position.

* * * * *